(12) United States Patent
Hatakeyama et al.

(10) Patent No.: US 8,773,630 B2
(45) Date of Patent: Jul. 8, 2014

(54) DISPLAY DEVICE

(75) Inventors: Eisuke Hatakeyama, Chiba (JP); Tetsuya Oshima, Mobara (JP); Kei Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 113 days.

(21) Appl. No.: 13/412,733

(22) Filed: Mar. 6, 2012

(65) Prior Publication Data

US 2012/0229750 A1  Sep. 13, 2012

(30) Foreign Application Priority Data

Mar. 9, 2011 (JP) ................... 2011-050989

(51) Int. Cl.
*G02F 1/1339* (2006.01)
*G02F 1/1345* (2006.01)

(52) U.S. Cl.
USPC ............ 349/154; 349/153; 349/149; 349/190

(58) Field of Classification Search
None
See application file for complete search history.

(56) References Cited

U.S. PATENT DOCUMENTS 7,817,237 B2 * 10/2010 Abe .............................. 349/153

FOREIGN PATENT DOCUMENTS

| JP | 2008-304493 | 12/2008 |
|---|---|---|
| JP | 2009-025331 | 2/2009 |

OTHER PUBLICATIONS

Machine translation, Japanese Patent Application Publication No. JP 2009-025331. Translation obtained Aug. 8, 2013.*

* cited by examiner

*Primary Examiner* — Bumsuk Won
*Assistant Examiner* — Angela Davison
(74) *Attorney, Agent, or Firm* — Antonelli, Terry, Stout & Kraus, LLP.

(57) ABSTRACT

A display panel includes a bonded substrate which is bonded with a seal portion having an inlet portion, in which an inlet of a fluid is formed, a sealing material which seals the inlet, metal film patterns which are provided in an end portion of the bonded substrate, and external connection terminals which respectively have rectangular base portions and are provided in parallel in a transverse direction of the base portion. Each metal film pattern has a rectangular pattern base portion. The metal film patterns are provided in parallel such that the center position of the pattern base portion in the transverse direction is aligned with the center position of the base portion in the transverse direction. The width of the pattern base portion in the transverse direction is equal to or smaller than the width of the base portion in the transverse direction at the same arrangement position.

5 Claims, 7 Drawing Sheets

DISPLAY DEVICE

CROSS-REFERENCE TO RELATED APPLICATION

The present application claims priority from Japanese application JP2011-050989 filed on Mar. 9, 2011, the contents of which are hereby incorporated by reference into this application.

BACKGROUND OF THE INVENTION

1. Field of the Invention

The present invention relates to a display device which has a metal film pattern for confirming the position and dimension precision of a sealing material sealing a fluid in a display panel.

2. Description of the Related Art

In the related art, a display panel of a display device is bonded with a seal portion having an inlet portion, in which an inlet of a fluid is formed, and the fluid is filled from the inlet such that the fluid is held between the bonded substrates. For example, a liquid crystal display is provided in which a TFT substrate having pixel electrodes, thin film transistors, and the like and a CF substrate having color filters and the like are bonded by a seal portion formed on the TFT substrate in a frame shape. In this liquid crystal display, liquid crystal material as a fluid is filled from an inlet, and the inlet is sealed with a sealing material made of insulating resin or the like, so that the liquid crystal material is held between the TFT substrate and the CF substrate.

In this display device, the sealing material spreads from the inlet outside the appearance of the substrate. For this reason, if the position and dimension are not kept within standards, when the display panel is attached to the housing or the like of the display device, the display panel is attached with difficulty due to the sealing material. Accordingly, a liquid crystal display is suggested in which a plurality of metal film patterns are formed near an inlet portion to confirm the position and dimension precision of a sealing material, and it is determined whether or not the position and dimension of the sealing material are kept within standards on the basis of the metal film patterns (for example, see JP 2009-25331 A).

In order to improve a production acquisition rate, the product forming regions of a plurality of liquid crystal display panels are partitioned by cutting-plane lines, and a large bonded substrate in which a multi TFT substrate having pixel electrodes, thin film transistors, and the like in the respective product forming regions and a multi CF substrate having color filters and the like in the respective product forming regions are bonded through seal portions formed in the respective product forming regions is divided along the cutting-plane lines (for example, see JP 2008-304493 A).

In the large bonded substrate of the liquid crystal display described in JP 2008-304493 A, the inlet portion of one product forming region is formed to protrude to an adjacent product forming region, and the product forming regions are efficiently arranged (hereinafter, referred to as full just arrangement) within the surface of the large bonded substrate. When the full just arrangement is used, similarly to the inlet portion, the metal film patterns are formed to protrude from one product forming region to an adjacent product forming region.

However, in the full just arrangement, if a metal film pattern which protrudes to an adjacent product forming region is arranged near an external connection terminal of a product forming region on the protruding side, when a terminal of a flexible printed board or the like, to which the external connection terminal will be connected, is thermally compressed along with the external connection terminal and an insulating layer is broken, the metal film pattern causes short-circuiting between the terminals.

In order to solve the problem of short-circuiting due to the metal film pattern, instead of the metal film pattern, the use of a pattern made of an insulating material is considered. Meanwhile, a pattern made of an insulating material causes deterioration in visibility.

SUMMARY OF THE INVENTION

The invention has been finalized in consideration of the above-described situation, and an object of the invention is to provide a display device capable of preventing short-circuiting due to metal film patterns for confirming the position and dimension precision of a sealing material sealing a fluid in a display panel.

In order to solve the above-described problem and to achieve the object, a display device according to an aspect of the invention includes a display panel. The display panel has a bonded substrate which is bonded with a seal portion having an inlet portion, in which an inlet of a fluid is formed, a sealing material which seals the inlet, a plurality of metal film patterns which are provided in the end portion of the bonded substrate to confirm the position and dimension precision of the sealing material, and a plurality of external connection terminals which respectively have rectangular base portions and are provided in parallel in the transverse direction of the base portion. Each metal film pattern has a rectangular pattern base portion which becomes the base portion of the metal film pattern, the metal film patterns are provided in parallel in the transverse direction such that the center position of the pattern base portion in the transverse direction is aligned with the center position of the base portion in the transverse direction, and the width of the pattern base portion in the transverse direction is equal to or smaller than the width of the base portion in the transverse direction at the same arrangement position.

In the display device, each metal film pattern may be formed in the same layer as the external connection terminal.

In the display device, the metal film patterns are arranged in metal film pattern groups in which a plurality of metal film patterns are provided in parallel to be aggregated vicinally.

In the display device, two metal film pattern groups may be arranged near each lateral portion of the inlet portion.

In the display device, the metal film patterns may be provided in parallel at an interval compared to the external connection terminals.

In the display device according to the aspect of the invention, the metal film patterns are provided in parallel in the transverse direction such that the center position of the pattern base portion in the transverse direction is aligned with the center position of the base portion in the transverse direction, and the width of the pattern base portion in the transverse direction is equal to or smaller than the width of the base portion in the transverse direction at the same arrangement position. Therefore, it is possible to prevent short-circuiting due to the metal film patterns for confirming the position and dimension precision of the sealing material sealing the fluid in the display panel.

DETAILED DESCRIPTION OF THE INVENTION

Hereinafter, a preferred embodiment of a display device according to the invention will be described in detail with reference to the drawings.

[Embodiment]

Figure 1:
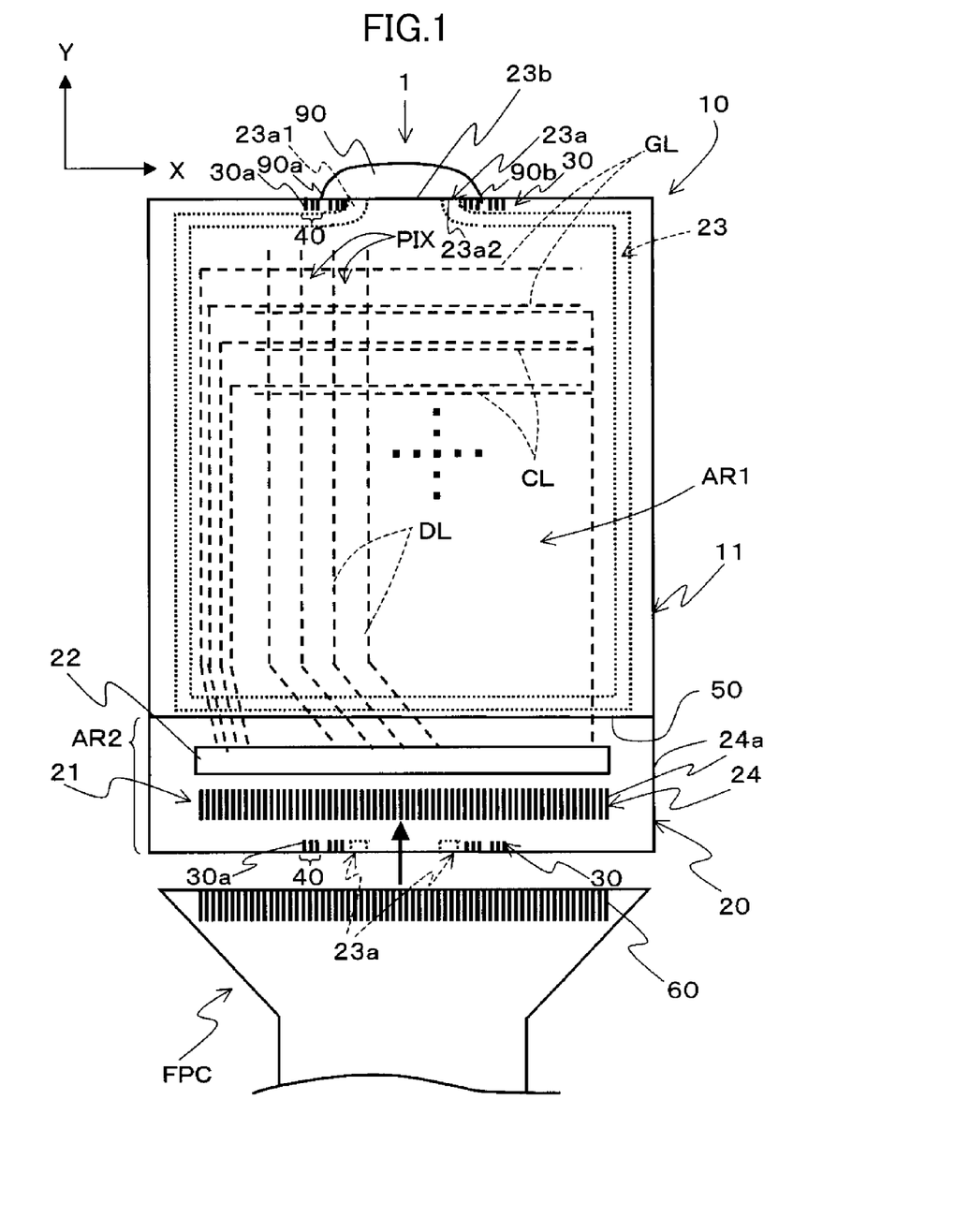
FIG. 1 is a schematic view of a display device according to an embodiment of the invention.
Figure 2:
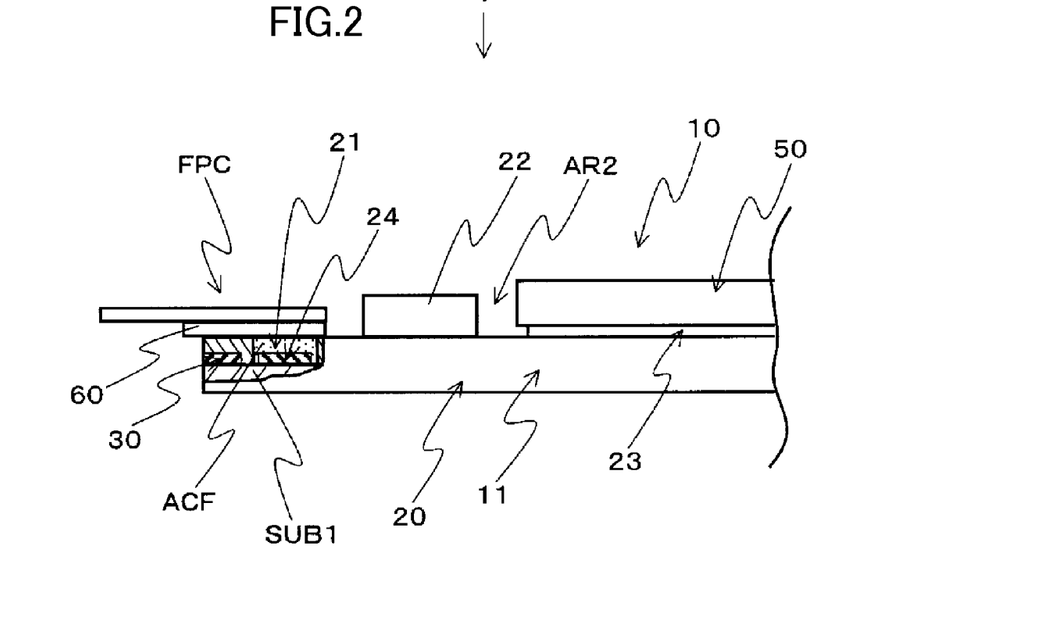
FIG. 2 is an enlarged side view showing a main part and a partial cross-section of the display device shown in FIG. 1.

FIG. 1 is a schematic view of a display device 1 according to an embodiment of the invention. FIG. 2 is an enlarged side view showing a main part and a partial cross-section of the display device 1 shown in FIG. 1.

The display device 1 according to the embodiment of the invention is an active matrix type liquid crystal display which has metal film patterns 30 for confirming the position and dimension precision of a sealing material 90 sealing a fluid in a display panel 10. The display device 1 has a display panel 10, a flexible printed board FPC, and a control section (not shown).

First, the display panel 10 will be described.

The display panel 10 has a bonded substrate 11 which is bonded with a seal portion 23 having an inlet portion 23a, in which an inlet 23b of a liquid crystal material LC is formed.

More specifically, the bonded substrate 11 has a rectangular TFT substrate 20 and a rectangular CF substrate 50 in which the length of the short side is substantially equal to the length of the short side of the TFT substrate 20 and the length of the long side is shorter than the length of the long side of the TFT substrate 20. The TFT substrate 20 and the CF substrate 50 are arranged to be opposite each other with the liquid crystal material LC interposed therebetween. With the difference in dimension between the TFT substrate 20 and the CF substrate 50, the TFT substrate is provided with a region (hereinafter, referred to as a non-overlapping region AR2) which does not overlap the CF substrate 50.

The TFT substrate 20 is a substrate having pixel electrodes PX, thin film transistors TFT, and the like.

The TFT substrate 20 has a terminal portion 21, a driving circuit 22, a seal portion 23, and a plurality of metal film patterns 30.

The terminal portion 21 is provided in the non-overlapping region AR2 and has a plurality of external connection terminals 24. Each external connection terminal 24 is a terminal which fetches a signal or power from a circuit externally attached to the display panel 10 into the display panel 10. Each external connection terminal 24 has a rectangular base portion 24a. The external connection terminals 24 are arranged in parallel in the transverse direction of the base portion 24a.

In this embodiment, each external connection terminal 24 is electrically and mechanically connected to each connection terminal 60 of the flexible printed board FPC, and fetches a signal or power supplied through the flexible printed board FPC into the display panel 10.

The driving circuit 22 is provided in the non-overlapping region AR2, and drives after-mentioned gate signal lines GL and drain signal lines DL on the basis of video signals and scanning signals fetched into the display panel 10 through the terminal portion 21. A reference voltage supplied from the flexible printed board FPC to a counter electrode CT of a plurality of pixels is directly applied from the external connection terminals 24 without passing through the driving circuit 22.

The seal portion 23 is made of thermosetting resin and formed on the TFT substrate 20 in a frame shape to follow the appearance shape of the CF substrate 50 to be bonded. The seal portion 23 has the inlet portion 23a in which the inlet 23b of the liquid crystal material LC is formed. The seal portion 23 functions to hold the liquid crystal material LC injected from the inlet 23b between the TFT substrate 20 and the CF substrate 50, and to bond the TFT substrate 20 and the CF substrate 50. The seal portion 23 may be formed on the CF substrate 50.

The metal film patterns 30 are metal film patterns for confirming the position and dimension precision of the sealing material 90, and are formed of a metal film in the same layer as the terminal portion 21. The metal film patterns 30 will be described below in more detail.

The liquid crystal material LC is injected from the inlet 23b of the seal portion 23, and the inlet 23b is blocked by the sealing material 90 made of resin or the like, so that the liquid crystal material LC is held between the TFT substrate 20 and the CF substrate 50.

The display panel 10 has a plurality of gate signal lines GL and a plurality of drain signal lines DL. The gate signal lines GL extend on the surface of a display region AR1 of the TFT substrate 20 facing the liquid crystal material LC in the X direction of the drawing and are provided in parallel in the Y direction. The drain signal lines DL extend in the Y direction of the drawing to be insulated from the gate signal lines GL and are provided in parallel in the X direction. Each region surrounded by the signal lines GL and DL becomes a pixel region. One end of each of the gate signal lines GL and the drain signal lines DL extends beyond the seal portion 23 and is connected to the driving circuit 22.

Next, the flexible printed board FPC will be described.

The flexible printed board FPC is a circuit board which connects the display panel 10 and the control unit (not shown), and has a plurality of connection terminals 60 which are electrically and mechanically connected to the external connection terminals 24. The connection terminals 60 are formed corresponding to the external connection terminals 24 and, as shown in FIG. 2, connected to the external connection terminals 24 through an anisotropic conductive film ACF. When the connection terminals 60 and the external connection terminals 24 are connected, the connection terminals 60 and the external connection terminals 24 are thermally compressed through the anisotropic conductive film ACF.

The control unit (not shown) is realized by a CPU or the like. The control unit is electrically connected to the respective units of the display device 1 and controls the overall operation of the display device 1. The control unit (not shown) has a memory (not shown) or the like which temporarily holds video data input from an external system.

Figure 3:
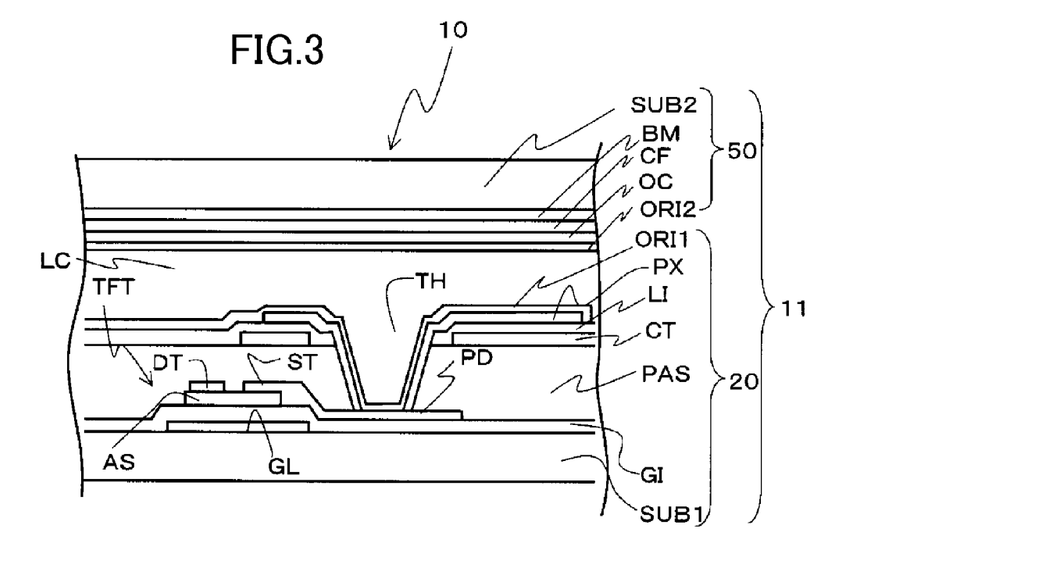
FIG. 3 is a sectional view showing a main part of a display region of the display panel shown in FIG. 1.

Next, the cross-sectional configuration of the display panel 10 will be described with reference to FIG. 3. FIG. 3 is a sectional view showing a main part of the display region AR1 of the display panel 10 shown in FIG. 1.

First, the cross-section of the TFT substrate 20 will be described. The TFT substrate 20 is configured such that the gate signal lines GL made of a metal material are formed on the surface of a substrate SUB1, which is a transparent substrate made of glass or the like, facing the liquid crystal material LC.

When the gate signal lines GL are formed, the external connection terminals 24 and the metal film patterns 30 are formed of the same metal film as the gate signal lines GL.

An insulating film GI is formed on the surface of the substrate SUB1 to cover the surface of the substrate SUB1 including the gate signal lines GL. The insulating film GL is made of an inorganic material, such as silicon nitride or the like, and functions as a gate insulating film in a region where the thin film transistor TFT will be formed.

A semiconductor layer AS made of, for example, amorphous silicon is formed in the region, in which the thin film transistor TFT will be formed, overlapping a part of the gate signal line GL on the surface of the insulating film GL facing the liquid crystal material LC. The thin film transistor TFT is configured such that a drain electrode DT and a source electrode ST arranged to be opposite each other are formed on the surface of the semiconductor layer AS, and a part of the gate signal line GL forms agate electrode.

The drain electrode DT is formed by extending a part of the drain signal line DL to the surface of the semiconductor layer AS. That is, the drain signal lines DL are formed on the surface of the insulating film. GI facing the liquid crystal material LC. The source electrode ST is formed when the drain signal line DL is formed. The source electrode ST has a pad portion PD which extends to the pixel region beyond the region where the semiconductor layer AS is formed. The pad portion PD is a portion which is electrically connected to the pixel electrode PX.

An insulating film PAS made of an organic material is formed on the upper surface of the drain electrode DT (drain signal line DL) or the like.

A common signal line CL is formed on the surface of the insulating film PAS. The common signal line CL also functions as the counter electrode CT. The common signal line CL (counter electrode CT) is made of a transmissive conductive film such as ITO (Indium. Tin Oxide). An insulating film LI made of an inorganic material is formed on the common signal line CL (counter electrode CT) or the like.

The pixel electrode PX is formed in each pixel region on the insulating film LI. The insulating film LI functions as an insulating film between the pixel electrode PX and the counter electrode CT. The pixel electrode PX is made of, for example, a transmissive conductive film, such as ITO (Indium Tin Oxide). The pixel electrode PX is electrically connected to the pad portion PD of the source electrode ST through a through hole TH formed to pass through the insulating film LI and the insulating film PAS. An alignment film ORI1 is formed on the pixel electrode PX or the like. The alignment film ORI1 is provided to determine the initial alignment direction of the liquid crystal material LC.

Next, the CF substrate 50 will be described. The CF substrate 50 is configured such that a light-shielding film BM, colored films CF, a protective film OC, and an alignment film ORI2 are sequentially formed on the surface of a substrate SUB2, which is a transparent substrate made of glass or the like, facing the liquid crystal material LC. The light-shielding film BM is a light-shielding film which is made of black resin and arranged between the colored films CF.

The colored films CF are resin films which contain dyes or pigments having three primary colors of R (red), G (green), and B (blue).

The protective film OC is a film which is made of resin, and protects and planarizes the surfaces of the colored films CF. The alignment film. ORI2 is provided to determine the initial alignment direction of the liquid crystal material LC.

Figure 4:
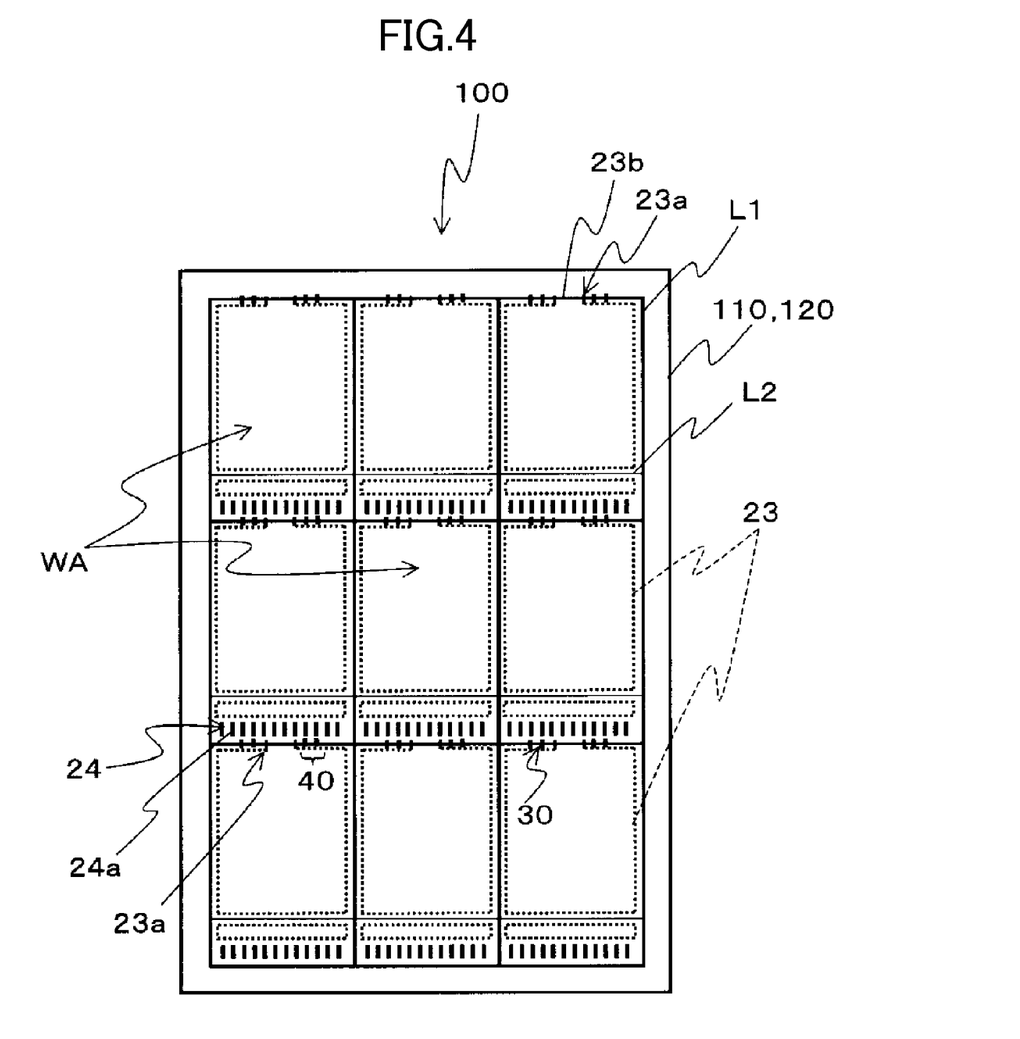
FIG. 4 is a schematic view of a large bonded substrate which is used in manufacturing the display panel shown in FIG. 1.
Figure 5:
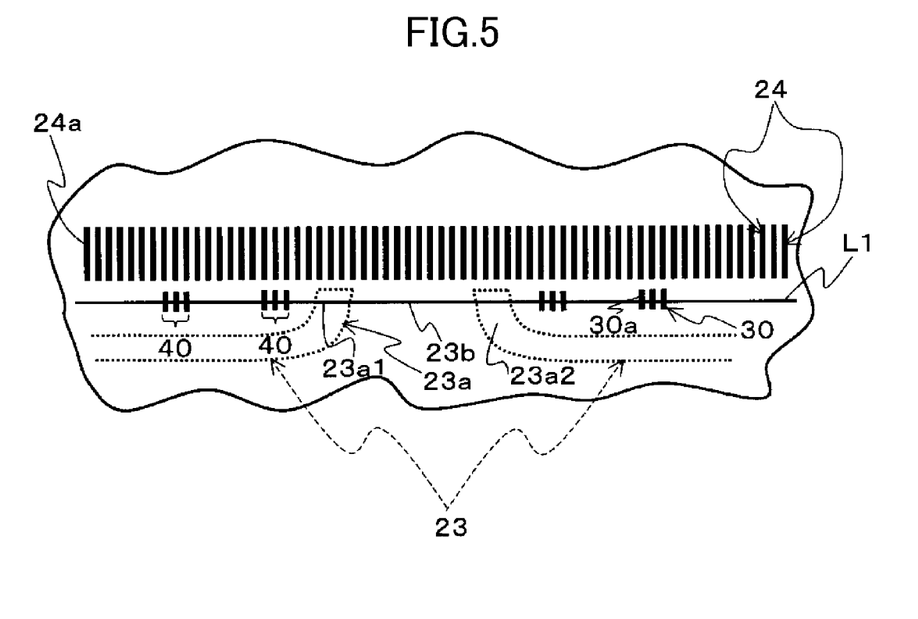
FIG. 5 is an enlarged view of a main part of the large bonded substrate shown in FIG. 4.

Next, a large bonded substrate 100 which is used in manufacturing the display panel 10 will be described with reference to FIGS. 4 and 5. FIG. 4 is a schematic view of the large bonded substrate 100 which is used in manufacturing the display panel 10 shown in FIG. 1. FIG. 5 is an enlarged view showing a main part of the large bonded substrate 100 shown in FIG. 4. A line indicated by symbol L2 in FIG. 4 is a cutting-plane line of a CF substrate for forming the non-overlapping region AR2.

In order to improve a product acquisition rate, the large bonded substrate 100 is a substrate in which a multi TFT substrate 110 in which a plurality of product forming regions are partitioned by cutting-plane lines L1 and the TFT substrate 20 is arranged in each product forming region WA by full just arrangement and a multi CF substrate 120 in which the CF substrate 50 is arranged in each product forming region WA by full just arrangement are bonded through the seal portion 23. Although FIG. 5 shows a case where the product forming regions WA are partitioned in three rows and three columns, the number of partitions is not limited thereto, and a different number of partitions may be provided.

As shown in FIG. 5, in the large bonded substrate 100, a part of the inlet portion 23a of one product forming region WA is formed to protrude to an adjacent product forming region WA, thereby improving the product acquisition rate. For this reason, a part of the metal film pattern 30 is formed near the terminal portion 21 along with the inlet portion 23a.

Figure 6:
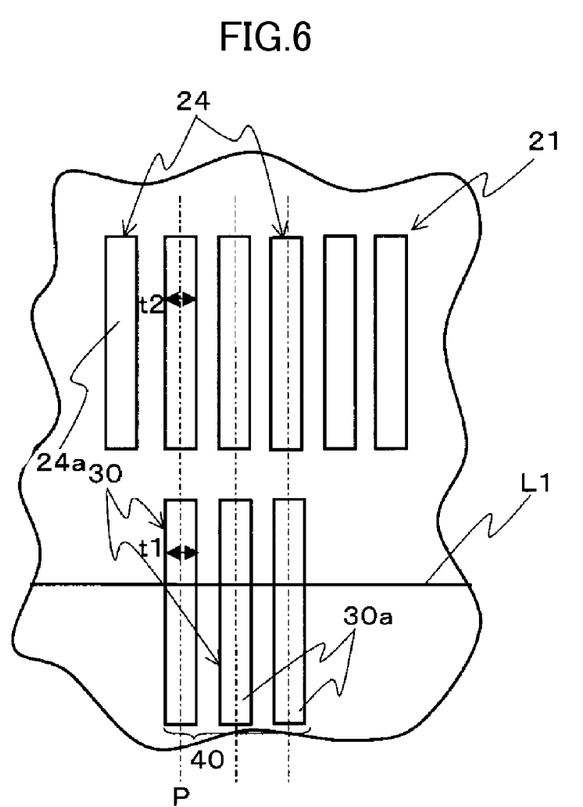
FIG. 6 is an enlarged view of metal film patterns shown in FIG. 1.

The metal film patterns 30 will be described in more detail. FIG. 6 is an enlarged view of the metal film patterns 30 shown in FIG. 1.

As shown in FIG. 6, each metal film pattern 30 has a rectangular pattern base portion 30a which becomes the base portion of the metal film pattern 30. The metal film patterns 30 are provided in parallel in the transverse direction such that the center position P of the pattern base portion 30a in the transverse direction is aligned with the center position of the base portion 24a of the external connection terminal 24 in the transverse direction. The width t1 of the pattern base portion 30a in the transverse direction is equal to the width of the width t2 of the base portion 24a of the external connection terminal 24 in the transverse direction at the same arrangement position.

The metal film patterns 30 are arranged at the same interval as the interval of the external connection terminals 24. Accordingly, when the connection terminals 60 of the flexible printed board FPC are connected to the external connection terminals 24, even if the insulating film of the TFT substrate 20 is broken, the occurrence of short-circuiting is suppressed.

In this embodiment, from the viewpoint of visibility, the metal film patterns 30 are arranged in metal film pattern groups 40 in each of which three metal film patterns 30 are provided in parallel to be aggregated vicinally. Two metal film pattern groups 40 are arranged near each of lateral portions 23a1 and 23a2 of the inlet portion 23a.

Accordingly, as shown in FIG. 1, when edges 90a and 90b of the sealing material 90 are between the two metal film pattern groups 40 arranged near each of the lateral portions 23a1 and 23a2 of the inlet portion 23a, it can be determined that the position and dimension precision of the sealing material 90 are within standards.

In the display device 1 according to the embodiment of the invention, a plurality of metal film patterns 30 are provided in parallel in the transverse direction such that the center position of the pattern base portion 30a in the transverse direction is aligned with the center position of the base portion 24a in the transverse direction. The width of the pattern base portion 30a in the transverse direction is equal to or smaller than the width of the base portion 24a in the transverse direction at the same arrangement position. Therefore, it is possible to prevent short-circuiting due to the metal film patterns 30 for confirming the position and dimension precision of the sealing material 90 sealing the liquid crystal material LC in the display panel 10.

In the display device 1 according to the embodiment of the invention, each of a plurality of metal film patterns 30 is formed in the same layer as the external connection terminal 24, thereby easily forming the metal film patterns.

In the display device 1 according to the embodiment of the invention, the metal film patterns 30 are arranged in the metal film pattern groups 40 in each of which a plurality of metal film patterns 30 are provided in parallel to be aggregated vicinally, thereby securing satisfactory visibility.

In the display device 1 according to the embodiment of the invention, the two metal film pattern groups 40 are arranged near each of the lateral portions 23a1 and 23a2 of the inlet portion 23a. Therefore, it is possible to easily confirm the position of the edge of the sealing material 90, and as a result, to easily confirm the position and dimension precision of the sealing material 90.

[Modification 1]

Figure 7:
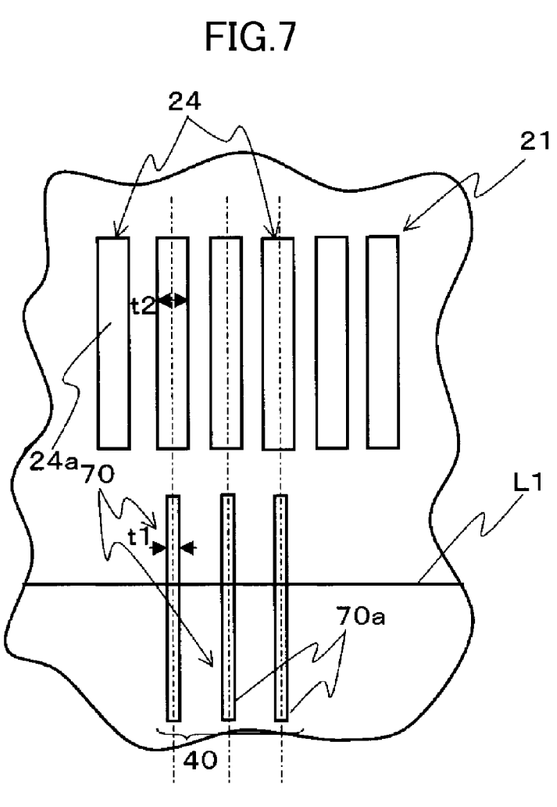
FIG. 7 is a diagram showing metal film patterns of Modification 1 of the embodiment of the invention.

Modification 1 of the embodiment of the invention will be described with reference to FIG. 7. FIG. 7 is a diagram showing metal film patterns 70 of Modification 1 of the embodiment of the invention.

The metal film patterns 70 of Modification 1 are arranged in parallel such that the interval between the center positions of pattern base portions 70a in the transverse direction becomes equal to the interval between the center positions of the base portions in the transverse direction. The width t1 of the pattern base portion 70a in the transverse direction is smaller than the width t2 of the base portion 24a in the transverse direction.

The same portions as those in the embodiment are represented by the same reference numerals.

The metal film patterns 70 of Modification 1 are provided in parallel at an interval compared to the external connection terminals 24, thereby effectively preventing the occurrence of short-circuiting due to the metal film patterns 70. The width of the pattern base portion 70a in the transverse direction may be set to such a width that visibility is not deteriorated.

[Modification 2]

Figure 8:
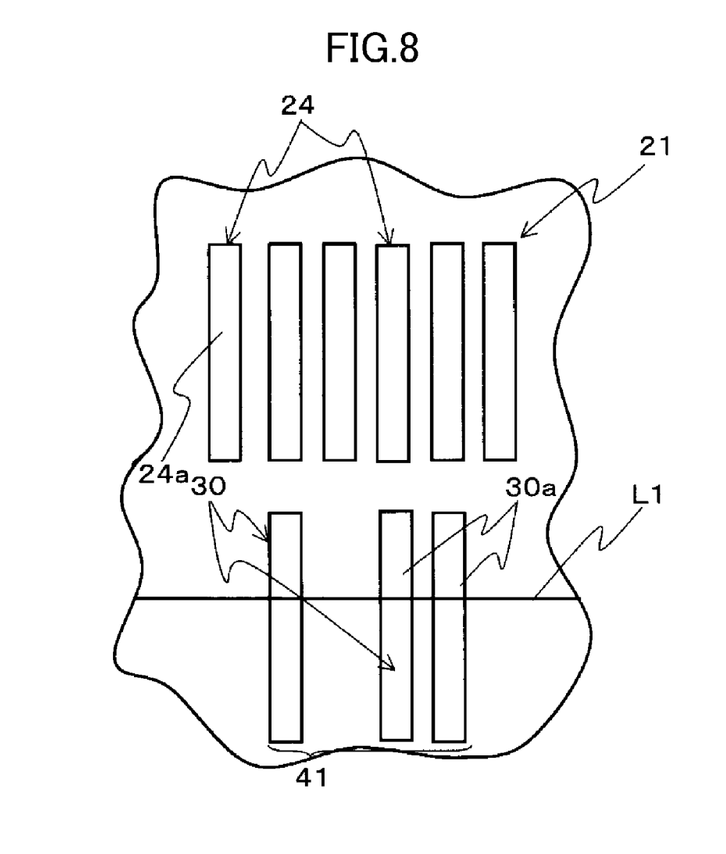
FIG. 8 is a diagram showing metal film patterns of Modification 2 of the embodiment of the invention.

Next, Modification 2 of the embodiment of the invention will be described with reference to FIG. 8. FIG. 8 is a diagram showing metal film patterns 30 of Modification 2 of the embodiment of the invention.

In regard to the metal film patterns 30 of Modification 2, three metal film patterns 30 are provided in parallel at an interval by one of the external connection terminals 24 provided in parallel to form a metal film pattern group 41.

The same portions as those in the embodiment are represented by the same reference numerals.

The metal film patterns 30 of Modification 2 are arranged at an interval compared to the external connection terminals 24, thereby more effectively preventing short-circuiting due to the metal film patterns 30.

[Modification 3]

Figure 9:
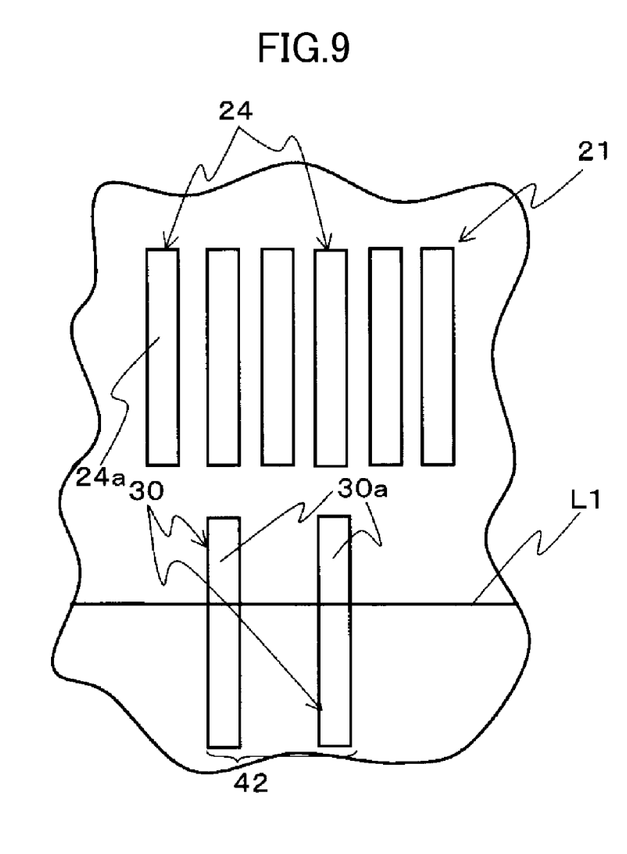
FIG. 9 is a diagram showing metal film patterns of Modification 3 of the embodiment of the invention.

Next, Modification 3 of the embodiment of the invention will be described with reference to FIG. 9. FIG. 9 is a diagram showing metal film patterns 30 of Modification 3 of the embodiment of the invention.

In regard to the metal film patterns 30 of Modification 3, two metal film patterns 30 are provided in parallel at an interval by one of the external connection terminals 24 provided in parallel to form a metal film pattern group 42.

The same portions as those in the embodiment are represented by the same reference numerals.

The metal film patterns 30 of Modification 3 are provided in parallel at an interval compared to the external connection terminals 24, thereby more effectively preventing the occurrence of short-circuiting due to the metal film patterns 30. The interval between the metal film patterns 30 may be set to such an interval that visibility is not deteriorated.

[Modification 4]

Figure 10:
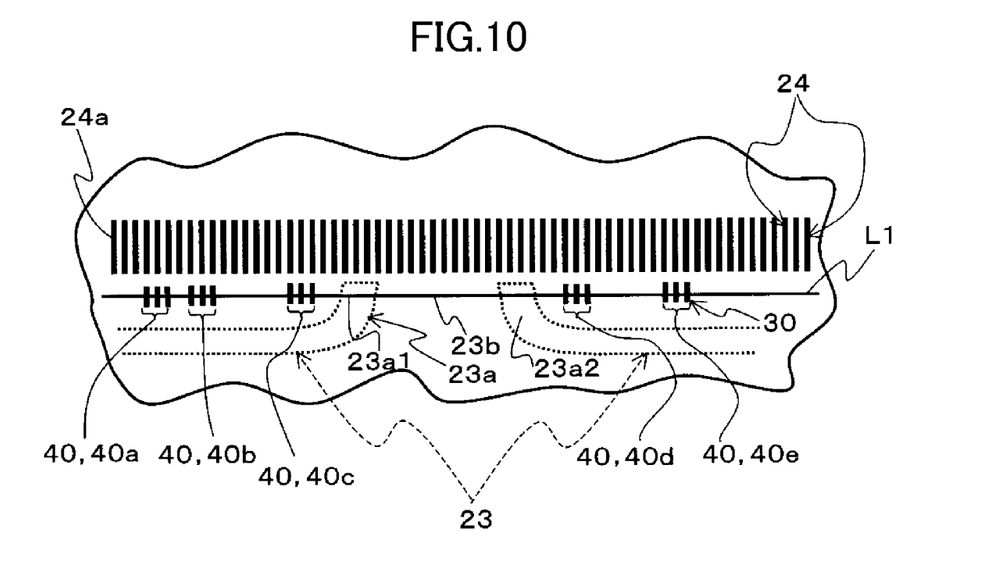
FIG. 10 is a diagram showing metal film patterns of Modification 4 of the embodiment of the invention.

Next, Modification 4 of the embodiment of the invention will be described with reference to FIG. 10. FIG. 10 is a diagram showing metal film patterns 30 of Modification 4 of the embodiment of the invention.

Although in this embodiment, the two metal film pattern groups 40 are arranged near each of the lateral portions 23a1 and 23a2 of the inlet portion 23a, in Modification 4, three metal film pattern groups 40a, 40b, and 40c are arranged near one lateral portion 23a1 of the inlet portion 23a, and two metal film pattern groups 40d and 40e are arranged near the other lateral portion 23a2.

The same portions as those in the embodiment are represented by the same reference numerals.

In regard to the metal film patterns 40 of Modification 4, the positions of the edges 90a and 90b of the sealing material 90 are confirmed between the metal film pattern group 40b and the metal film pattern group 40c and between the metal film pattern group 40d and the metal film pattern group 40e. The metal film pattern group 40a represents that inspection is initially done between the metal film pattern group 40b and the metal film pattern group 40c.

Therefore, it becomes easy to standardize the operation procedure for confirming the position and dimension precision of the sealing material 90.

Although in this embodiment, a case where the metal film patterns 30 and 70 are viewed has been described, the invention is not limited thereto. An inspection device may be used to determine whether or not the position and dimension precision of the sealing material 90 are satisfactory. For example, a device which transmits X rays to inspect the metal film patterns 30 and 70 may determine whether or not the position and dimension precision of the sealing material 90 are satisfactory.

Although in the embodiment of the invention, as the display device 1, a liquid crystal display has been described, the invention is not limited thereto. That is, the invention may be applied to other display devices insofar as the display devices include a display panel, the display panel having a bonded substrate which is bonded with a seal portion having an inlet portion, in which an inlet of a fluid is formed, a sealing material which seals the inlet, a plurality of metal film patterns which are provided in the end portion of the bonded substrate to confirm the position and dimension of the sealing material, and a plurality of external connection terminals which respectively have rectangular base portions and are provided in parallel in the transverse direction of the base portion.

Although in the embodiment of the invention, an example where the display device 1 has a flexible printed board FPC has been described, the invention is not limited thereto. That is, other circuit boards may be used insofar as the circuit boards have the connection terminals 60 which are electrically and mechanically connected to the external connection terminals 24. For example, instead of the flexible printed board FPC, a so-called rigid flexible printed board may be used.

Although the invention conceived by the inventors has been specifically described in connection with the above-described embodiment of the invention, the invention is not limited to the above-described embodiment of the invention, and may be modified in various ways without departing from the scope and spirit of the invention.

What is claimed is:

1. A display device comprising:
    a display panel,
    wherein the display panel has
        a bonded substrate which is bonded with a seal portion having an inlet portion, in which an inlet portion of a fluid is formed, the bonded substrate comprising a TFT substrate and a color filter substrate facing the TFT substrate, the TFT substrate having an overlapping region to the color filter substrate and a non-overlapping region to the color filter substrate in plan view,
        a sealing material which seals the inlet portion and is arranged between the TFT substrate and the color filter substrate,
        a plurality of first metal film patterns which are provided in a first end portion of the non-overlapping region to confirm position and dimension precision of the sealing material,
        a plurality of second metal film patterns which are provided in a second end portion of the overlapping region to confirm the position and dimension precision of the sealing material, the second end portion being located on a side of the TFT substrate opposite to the first end portion, the inlet portion being arranged between a first portion of the plurality of second metal film patterns and a second portion of the plurality of second metal film patterns,
        a flexible printed board having a plurality of connection terminals,
        a plurality of external connection terminals which respectively have first rectangular pattern base portions and are provided in parallel in a first direction on the non-overlapping region of the TFT substrate, each of the plurality of external connection terminals being connected to each of the plurality of connection terminals, and
    each of the plurality of first metal film patterns of the non-overlapping region having a second rectangular pattern base portion of the first metal film patterns, the first metal film patterns are provided in parallel in the first direction such that a first center position of the first rectangular pattern base portion of the plurality of external connection terminals in the first direction is aligned with a second center position of the second rectangular base portion of the plurality of first metal patterns in the first direction, and a second width of the second rectangular pattern base portion in the first direction is equal to or smaller than a first width of the first rectangular base portion in the first direction.

2. The display device according to claim 1,
    wherein each first metal film pattern is formed in a same layer as the external connection terminal.

3. The display device according to claim 1,
    wherein the first metal film patterns are arranged in metal film pattern groups in each of which two or more of the first metal film patterns are provided in parallel to be aggregated vicinally.

4. The display device according to claim 3,
    wherein two of the metal film pattern groups are arranged near each lateral portion of the inlet portion.

5. The display device according to claim 1,
    wherein the first metal film patterns are provided in parallel at an interval compared to the external connection terminals.

* * * * *